(12) United States Patent
Finkelstein et al.

(10) Patent No.: US 6,200,380 B1
(45) Date of Patent: Mar. 13, 2001

(54) METHOD FOR CONTINUOUS PRODUCTION FOR WALLBOARD TAPE JOINT COMPOUND

(75) Inventors: Ronald S. Finkelstein, East Amherst; Jashbhai M. Patel, Amherst, both of NY (US)

(73) Assignee: National Gypsum Company, Charlotte, NC (US)

( * ) Notice: Subject to any disclaimer, the term of this patent is extended or adjusted under 35 U.S.C. 154(b) by 0 days.

(21) Appl. No.: 09/249,886

(22) Filed: Feb. 16, 1999

(51) Int. Cl.$^7$ .............................. C04B 28/00; C04B 7/00; C04B 11/00
(52) U.S. Cl. ................... 106/783; 106/698; 106/772; 106/773; 106/774; 106/778; 106/801; 106/802; 106/803; 106/811; 106/814; 106/817
(58) Field of Search .................................. 106/772, 773, 106/774, 778, 783, 698, 801, 802, 803, 811, 814, 817

(56) References Cited

U.S. PATENT DOCUMENTS

| | | | |
|---|---|---|---|
| 563,797 | 7/1896 | Peters | 72/396 |
| 1,613,682 | 1/1927 | Tuttle | 366/15 |
| 2,989,291 | 6/1961 | Bedner | 259/174 |
| 3,793,269 | 2/1974 | Bruschtein et al. | 260/17 |
| 3,891,453 | 6/1975 | Williams | 106/85 |
| 4,223,996 | 9/1980 | Mathis et al. | 366/27 |
| 4,436,430 | 3/1984 | Mayer et al. | 366/13 |
| 4,449,826 | 5/1984 | Mathis et al. | 366/13 |
| 4,661,161 | 4/1987 | Jakacki et al. | 106/112 |
| 4,845,152 | 7/1989 | Palmer | 524/734 |
| 5,039,341 | 8/1991 | Meyer | 106/197.1 |
| 5,258,069 | 11/1993 | Knechtel et al. | 106/287.24 |
| 5,336,318 * | 8/1994 | Attard et al. | 106/780 |
| 5,417,493 | 5/1995 | Ericson | 366/343 |
| 5,484,200 | 1/1996 | Bradshaw | 366/15 |
| 5,494,708 | 2/1996 | Chess, Jr. | 427/421 |
| 5,570,743 | 11/1996 | Padgett et al. | 166/285 |
| 5,570,953 | 11/1996 | DeWall | 366/10 |
| 5,573,333 | 11/1996 | Dahlman | 366/132 |
| 5,653,797 | 8/1997 | Patel | 106/781 |
| 5,779,786 | 7/1998 | Patel | 106/781 |
| 5,879,825 | 3/1999 | Burke et al. | 428/703 |

OTHER PUBLICATIONS

PCT International Search Report, International Searching Authority, dated Mar. 29, 2000.
Kirk–Othmer Encyclopedia of Chemical Technology, vol. 21, Second Edition, 1970, pp. 621–624, [No Month].
Prater Industries, Inc. Product Sheet, Prater Continuous Mixer, undated.
Autocon Home Product Summary, undated, pp. 1–2.
Munson Machinery Company, Inc. Product Summary, Hi–Intensity Continuous Blenders, undated.
Sterling Controls, Inc. Product Summary, Accu–Portion Modular Systems, 1/94.

* cited by examiner

Primary Examiner—Anthony Green
(74) Attorney, Agent, or Firm—Marshall, O'Toole, Gerstein, Murray & Borun (57) ABSTRACT

A method of continuously producing a cementitious composition such as joint compound includes pre-mixing at least two dry ingredients and pre-mixing at least two liquid ingredients. The ingredients are provided in a continuous mixing apparatus and at least substantially continuously blended.

16 Claims, 5 Drawing Sheets

METHOD FOR CONTINUOUS PRODUCTION FOR WALLBOARD TAPE JOINT COMPOUND

BACKGROUND OF THE INVENTION

1. Field of the Invention

The present invention relates generally to the production of cementitious compositions, and more particularly the production of compounds for use in filling and coating joints between adjacent gypsum wallboard sheets, for repairing imperfections in building materials, and for texturizing.

2. Description of Related Technology

One of the most common methods today of constructing interior walls includes the use of inorganic wallboard panels or sheets such as gypsum wallboard, often referred to simply as "wallboard" or "drywall." The use of wallboard, as opposed to conventional wet plaster methods, is often desirable because the installation of wallboard is ordinarily less costly and faster than that for conventional plaster. Wallboard is conventionally produced by enclosing a core of an aqueous slurry of gypsum and other additives, materials between two large sheets of paper. After the gypsum slurry has set and dried, the sheet is cut into standard sizes. Gypsum wallboard is described, for example, in the Kirk-Othmer Encyclopedia of Chemical Technology, Second Edition, 1970, Vol. 21, pages 621–24, the disclosure of which is hereby incorporated herein by reference.

A wall is generally made by securing, e.g., with screws and/or nails, the wallboard to a support structure, for example vertically or horizontally oriented pieces of wood. Because wallboard is typically supplied in standard-sized sheets or panels, when forming a wall from the sheets, there will generally be a number of joints between adjacent sheets. In most wallboard construction, it is necessary to conceal these joints between adjacent panels so that the wall will have a smooth, monolithic finish similar to that obtained with conventional wet plaster methods. It is also typically necessary to conceal the screws and/or nails used to secure the wallboard panels to framing, the indentations caused by the screws and/or nails, imperfections in the wallboard panels, as well as other materials (e.g., corner beads) used to form the wall.

The prior art discloses a number of joint compound compositions (sometimes referred to by applicators as "mud") that can be used to conceal the joints between adjacent sheets of wallboard. Such compositions can also be applied to other defects in the wallboard, for example the defects or depressions caused by screws or nails used to hold the wallboard in place.

In order to conceal the joints between wallboard panels, the joint compound is typically applied in several layers or coats. A first coat of joint compound is placed in the joint between the wallboards with a wallboard knife, or trowel. The first coat is primarily for the purpose of filling the space between the adjacent wallboards. Joint tape (for example, made of paper) can then be embedded into the first coat of joint compound. It is conventional to apply the joint compound in several, e.g., three, coats or layers in order to obtain a smooth finish, and each coat of joint compound must be allowed to dry prior to the placement of the next coat of joint compound. (If the prior coat is not allowed to dry, problems such as excess shrinkage and/or cracking can occur.) Once dry, the treated area is sanded before applying the next finishing coat of joint compound. Joint compound may be used for other purposes, for example, to repair imperfections in various building materials and for adding texture to walls and ceilings.

There are many different types of joint compound. Joint compounds can be supplied in a dry powder form or in a mill mixed ready-mix form. They can also be of a "drying" type or a "setting" type.

The joint compound can be supplied in the form of a dry powder, to which an amount of water is added at the work site by the applicators to give the joint compound a suitable consistency. Other joint compounds, often referred to as "ready-mix" or "ready-mixed" joint compounds, are pre-mixed with water and other additives during manufacturing the product. These joint compounds are generally packaged and sold in a corrugated box or plastic pail in a form that is suitable for use with little or no addition of water at the job site. Ready-mixed joint compounds have several advantages such as providing a consistent product formulation, reducing or eliminating the time necessary to mix the joint compound with water on the job site, and eliminating the need to have water available at the job site.

Among the prior art joint compound compositions, it is known to generally use a filler (e.g., calcium carbonate, calcium sulfate hemihydrate, or calcium sulfate dihydrate) thickener, preservative and a binder, as well as various other additives to produce a joint compound. See U.S. Pat. No. 5,653,797, the disclosure of which is hereby incorporated herein by reference. General ranges of ingredients used in an all purpose, conventional-weight joint compound include the ingredients shown in Table I below.

TABLE I

| CONVENTIONAL WEIGHT JOINT COMPOUND | |
|---|---|
| Ingredient | Weight Percentage |
| Water | 20–37 |
| Preservatives | 0.02–1.0 |
| Calcium Carbonate | 10–100 |
| Mica (Filler) | 0.5–5.0 |
| Attagel Clay (non-leveling agent) | 0.5–5.0 |
| Cellulose Thickener | 0.12–1.0 |
| Latex (Binder) | 1.0–4.0 |
| Accelerator | 0.01–2.0 |

Many joint compounds are of the "drying," or "setting report," type. A large portion of a drying-type joint compound, comprises calcium carbonate ($CaCO_3$) and/or calcium sulfate dihydrate ($CaSO_4 \cdot 2H_2O$). Prior to use (generally during manufacturing), these components and a binder (along with several other known ingredients) are mixed for a specific time with water. After application, when the water dries (i.e., evaporates), a dry, relatively hard cementitious material is left behind. The calcium sulfate dihydrate and calcium carbonate may comprise a substantial portion of what is sometimes referred to as the filler component.

In order to avoid various disadvantages of the drying type of joint compound, compounds of the "setting type" have been developed. A setting-type joint compound includes calcium sulfate hemihydrate ($CaSO_4 \cdot \frac{1}{2}H_2O$, also referred to as calcined gypsum). (See U.S. Pat. No. 5,653,797, previously incorporated herein by reference.) In order to produce calcined gypsum, one converts calcium sulfate dihydrate from raw gypsum to the hemihydrate state through a known process called calcination. This process removes one and one-half molecules of water from the calcium sulfate dihydrate gypsum. The hemihydrate form of calcium sulfate is substantially more soluble in water than the dihydrate form of calcium sulfate. The calcium sulfate hemihydrate may comprise a substantial portion of what is sometimes referred to as the filler component.

During use in a setting joint compound, the calcium sulfate hemihydrate is rehydrated to the dihydrate state. This rehydration process normally takes place over a fairly short period of time. Accordingly, it has been extremely difficult to produce a joint compound comprising hemihydrate gypsum because the product would set in its storage container. Thus, joint compounds of the setting type have generally had to be supplied in the powder form. Setting joint compounds have the advantage of having generally quicker finishing times (setting time) than drying joint compounds. This is advantageous for the reasons stated above. Further, because setting joint compounds form a crystalline network upon setting (as opposed to merely drying), these compounds typically provide a stronger, more durable bond between adjacent wallboard sheets than do drying type joint compounds. However, because these compounds provide a stronger bond between adjacent wallboard sheets, the joint compound is often harder to sand to a smooth finish.

Although the industry has several types of joint compounds, joint compounds (particularly ready-mixed materials) are all generally manufactured by the same type of process, a batch process. However, using a batch process to manufacture joint compound creates several disadvantages. First, use of a batch process will limit the maximum production rate due to the longer mixing time and the need to complete one batch before beginning the next. Second, residence time in apparatus used for batch processes may be high, which typically causes relatively long production times. Third, in batch-mixing process, material build-up typically occurs in mixers used for batch operations, often resulting in long down times for cleanup, maintenance, and contaminations.

As demand for joint compound in the industry increases, it would be desirable to produce joint compound faster and more efficiently. It would also be desirable to provide a process for producing a joint compound product that does not vary from one batch to another. Moreover, it would be advantageous to provide a more effective process for producing joint compound products that reduces or eliminates the need for certain ingredients, thereby reducing the cost and complexity of the manufacturing process.

SUMMARY OF THE INVENTION

It is an object of the invention to overcome one or more of the problems described above.

Accordingly, the invention provides a method of continuously producing a cementitious slurry, comprising the steps of pre-mixing at least two dry ingredients, pre-mixing at least two liquid ingredients, providing the mixed dry ingredients and the mixed liquid ingredients in a continuous mixer, and at least substantially continuously blending the ingredients in the mixer to produce the cementitious slurry.

Other objects and advantages of the invention will be apparent to those skilled in the art from the following detailed description, taken in conjunction with the appended claims.

DETAILED DESCRIPTION OF THE INVENTION

According to the invention, a method of continuously producing a cementitious slurry is provided which comprises the steps of pre-mixing at least two dry ingredients, pre-mixing at least two liquid ingredients, providing the mixed dry ingredients and the mixed liquid ingredients in a continuous mixer, and at least substantially continuously blending the ingredients in the mixer to produce the cementitious slurry. According to one embodiment of the invention, the continuous process advantageously produces a cementitious slurry which includes about 25 weight percent to about 35 weight percent water, based on total weight of the slurry.

The cementitious compositions of the invention are generally produced by combining both dry solid and wet (liquid) ingredients. According to a preferred method of the invention, two or more of the dry materials or ingredients are first pre-blended in a mixing apparatus or blender. These dry ingredients, described in greater detail below, may include limestone, perlite, clay, mica, thickeners, binders, talc, gypsum (calcium sulfate dihydrate), stucco, and urea. Although the term dry materials or dry ingredients may be used, those of skill in the art will understand that such materials may include absorbed or chemically combined moisture.

The liquid ingredients used in the inventive method are also preferably pre-blended. In one embodiment, water and latex (e.g., in the form of an emulsion) are pre-blended, while the remaining liquid ingredients (described in detail below) are separately pre-blended. In another embodiment, all liquid ingredients are pre-blended together. Liquid ingredients used in the production of joint compound may include water, latex, glycol, dibutyl pthalate, preservatives, defoamers, and humectants.

After the preferred pre-blending step(s), both the dry ingredients and liquid ingredients are simultaneously fed into a continuous mixing apparatus. This mixing apparatus preferably operates in a range of about 650 revolutions per minute (rpm) to about 1600 rpm, as described in detail below. The ingredients are mixed in the continuous mixer for a predetermined period of time (e.g., about 0.35 to about 2 minutes), to form a uniform paste or slurry which then flows from the mixer. In a particularly preferred embodiment, all ingredients are continuously fed into the mixer, and the produced uniform paste or slurry is continuously extruded from the mixer.

Figure 1:
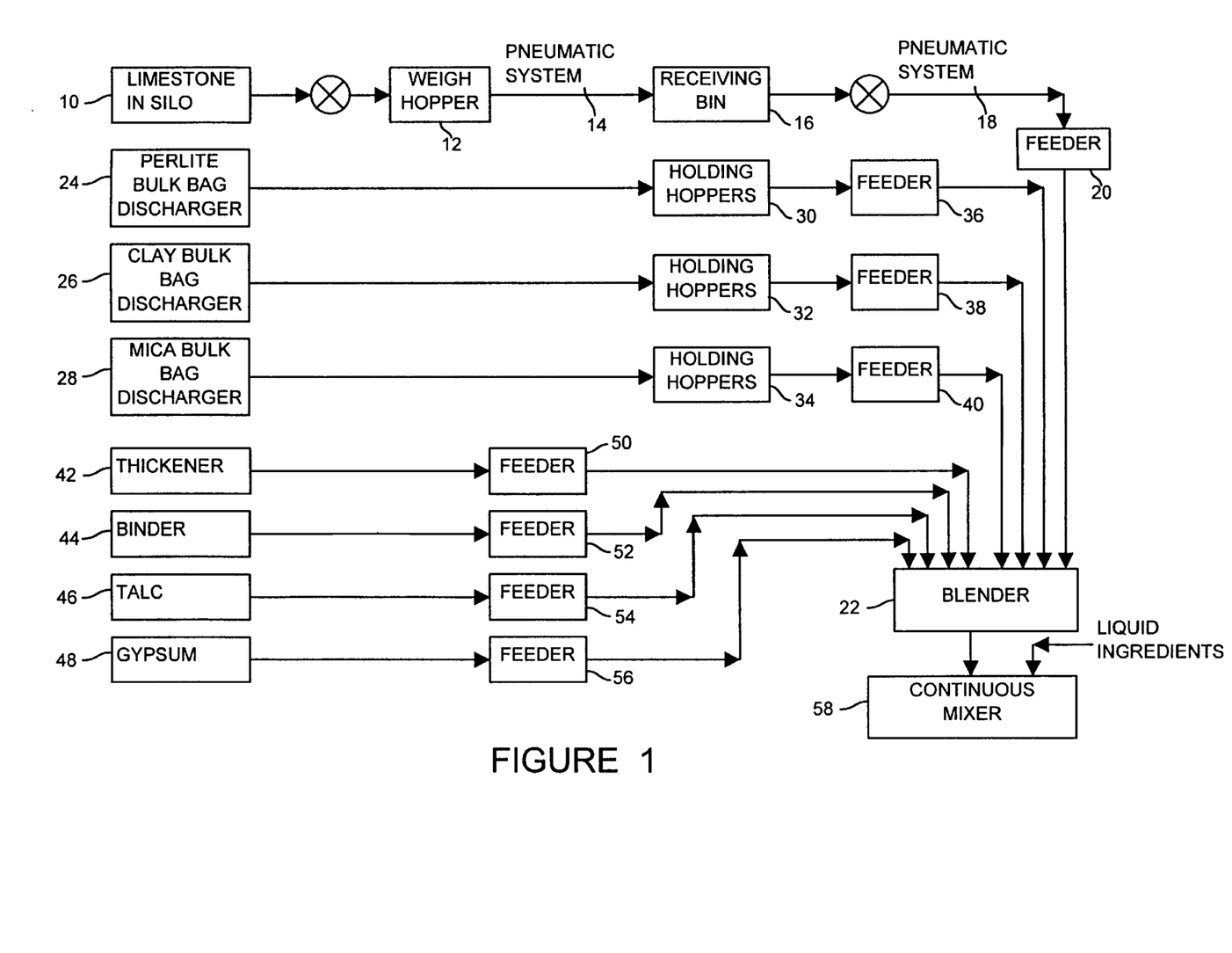
FIG. 1 is a process diagram of the dry powder ingredients used in accordance with an embodiment of the invention.
Figure 2:
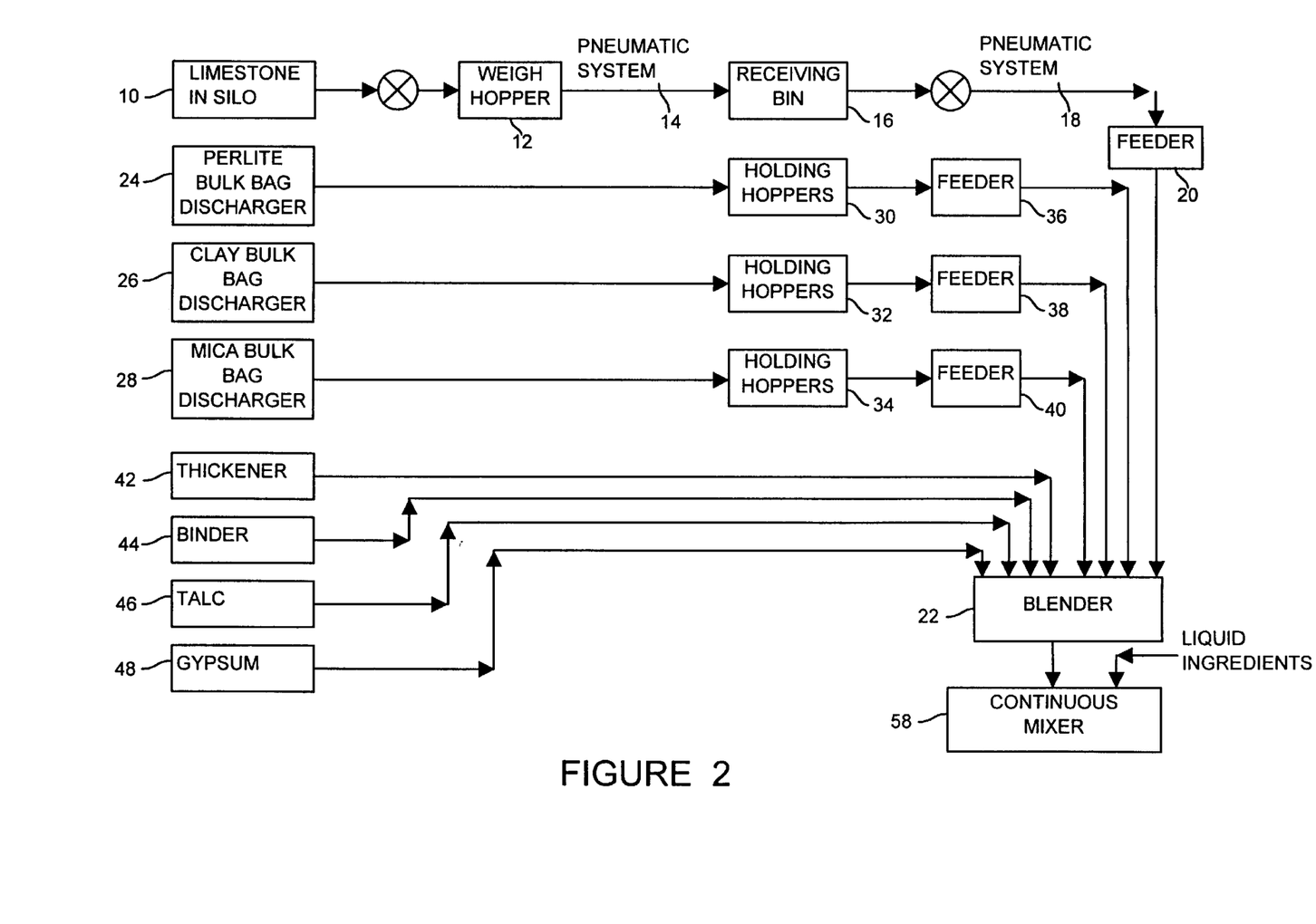
FIG. 2 is an alternate embodiment of a process diagram of the dry powder ingredients used according to the invention.

Referring now to both FIGS. 1 and 2, limestone, which may be stored in a silo 10, is transferred to a weigh hopper 12 (a holding or storage bin). The limestone, which is the primary ingredient in one joint compound of the invention, may be purchased from Georgia Marble of Kennesaw, Ga., York Limestone of York, Pa., or Pfizer Limestone of New York, N.Y. The limestone (calcium carbonate) in the inventive joint compound preferably comprises at least 50 weight percent for example, about 55 weight percent to about 75 weight percent limestone, and more preferably about 60 weight percent to about 70 weight percent, based upon the total weight of joint compound. The limestone is transferred from the weigh hopper 12 by a pneumatic system 14 which mechanically conveys the limestone to a receiving bin 16. The receiving bin 16 is not scale mounted, but preferably can automatically discharge the material on demand. The limestone is preferably transferred from the receiving bin 16 to a feeder hopper 20 by a second pneumatic system 18. The feeder hopper 20 then transfers the limestone to a blender 22, where it is preferably pre-blended with other ingredients. The limestone feed rate is preferably in a range of about 100 pounds/minute (about 45.5 kg/min) to about 400 pounds/minute (about 181.8 kg/min). This feed rate, as well as the other feed rates described below, is based upon the weight (or mass) of ingredient fed into a continuous mixing apparatus.

Any type of controlled feeder may be used as the feeder hopper. However, loss-in-weight type feeders, such as the Acrison feeder available from Acrison of Buffalo, N.Y., are preferred because they can provide a feed accuracy of ±0.5 weight percent. Furthermore, loss-in-weight type feeders also continuously monitor the actual flow of the dry ingredients as they are discharged from the feeder. Alternatively, less expensive volumetric-type feeders with an accuracy of ±2.0 weight percent can also be used. Such feeders do not monitor the actual feed delivered, but commercially-available devices can be added to monitor product being delivered from the feeder. Some ingredients, such as thickeners, are available in either liquid form or powder form. As described in greater detail below, for liquid ingredients there is preferably provided a liquid pump and metering system. Computer controls are preferably provided to regulate the amount and feed rate of the ingredients.

Turning now to other preferred ingredients, perlite, clay, and mica are generally supplied in bulk bags. Perlite is preferably used in the joint compound to control the density, shrinkage, and crack resistance of the joint compound. Perlite such as SilCel 43-34 expanded perlite, available from Silbrico Corp. of Chicago, Ill. may be used. The amount of perlite used in the joint compound produced according to the invention is preferably in a range of about 1 weight percent to about 6 weight percent, based on the total weight of joint compound. The perlite feed rate is preferably in a range of about 3 pounds/minute (about 1.4 kg/min) to about 6 pounds/minute (about 2.7 kg/min). However, perlite need not be used in conventional weight joint compounds of the invention.

Clay is preferably used in the inventive joint compound as a non-leveling agent and/or a thickening agent which controls the viscosity or rheology of the final product. Clay also helps enhance or create the water holding properties of the joint compound. A clay such as Supergel B/Mil White clay available from Mil White of Houston, Tex., may be used. The amount of clay used in the joint compound is in a range of about 1 weight percent to about 4 weight percent, based on the total weight of joint compound. The preferred feed rate varies from about 1 pound/minute (about 0.45 kg/min) to about 6 pounds/minute (about 2.7 kg/min).

Mica is also preferably included in the joint compound. Mica, which is a low bulk density mineral used as a filler or extender, may be purchased from KGM Corp. of Kings Mountain, N.C. Mica may also improve crack resistance of the joint compound. The amount of mica used in the joint compound may vary in a range of about 1 weight percent to about 4 weight percent, based on the total weight of joint compound, while the preferred feed rate preferably is in a range of about 1 pound/minute (about 0.45 kg/min) to about 4 pounds/minute (about 1.8 kg/min).

Commercially-available bulk bag dischargers for the perlite 24, clay 26, and mica 28 are preferably mounted on the floor of the production site to allow for direct fork lift service. These ingredients are conveyed to holding hoppers or receivers 30, 32, 34 mounted above feeder hoppers 36, 38, 40, respectively, which subsequently discharge the desired ingredient(s) into the blender 22. In a preferred operation, the feeders 36, 38, 40 are located on a mezzanine floor above, and are able to discharge the ingredients directly into, the blender 22. In another embodiment, the feeders 36, 38, 40 are mounted on the floor, and discharge the ingredients on to a conveyer/elevator (not shown in Figures). Such a conveyor/elevator then would transfer the ingredients to the blender 22 located on another level. With the feeders mounted on the floor, the process may be more efficient and less labor intensive.

The other preferred small quantity dry ingredients used in the invention, such as thickener, binder, talc, and gypsum, are received in bags, totes, or fiber drums on pallets 42, 44, 46, 48. Thickeners are used to control the viscosity, affect the reology, and affect the water holding characteristics of the produced joint compound. Thickeners may include the Methocel HPMC-40320 product manufactured by Dow Chemical of Midland, Mich., and products sold under the tradenames HEC Nexton-IP5A, IPSA, 3082R by Aqualon Chemical Company of Wilmington, Del., a division of Hercules Chemical. The amount of thickener used in the joint compound is preferably in a range of about 0.1 weight percent to about 5 weight percent, based on the total weight of joint compound. More specifically, the amount of the Methocel product used in the joint compound is preferably about 0. 1 weight percent to about 1 weight percent, based on weight of joint compound. The amount of HEC, IP5A, IPA, and 3082R thickeners used in the joint compound may be in a range of about 0.1 weight percent to about 5 weight percent, based on the total weight of joint compound. The preferred feed rate of thickeners is about 0.1 pound/minute (about 0.045 kg/min) to about 0.5 pound/minute (about 0.23 kg/min).

Binders are preferably used in the joint compound composition to improve bonding to the substrate such as wallboard. Binders used may include polyvinyl alcohol available from Air Products of Allentown, Pa. The binders are preferably included at a rate in a range of about 0.1 weight percent to about 0.4 weight percent, based on the total weight of joint compound, and the preferred feed rate is in a range of about 0.06 pound/minute (about 0.027 kg/min) to about 3 pounds/minute (about 1.36 kg/min).

Talc is preferably included in the joint compound to enhance application properties and also as a white extender pigment. Talc, such as the Talerom or MP 45-26 products manufactured by Barretts Minerals Inc., of Dillon, Mont., may be used in the joint compound. The amount of talc used in the joint compound is preferably in a range of about 1 weight percent to about 4 weight percent, based on the total weight of joint compound, and the preferred feed rate is preferably about 0.5 pound/minute (about 0.23 kg/min ) to about 3 pounds/minute (about 1.36 kg/min).

Some embodiments of the inventive joint compound, in addition to limestone, also include gypsum (calcium sulfate dihydrate). The amount of gypsum used in the joint compound is preferably in a range of about 5 weight percent to about 60 weight percent (based on the total weight of joint compound), and the preferred feed rate is about 22 pounds/minute (about 10 kg/min) to about 250 pounds/minute (about 100 kg/min).

The joint compounds of the invention may also include calcium sulfate hemihydrate (calcined gypsum or stucco) at a preferred rate of about 50 weight percent to about 80 weight percent based on the total weight of joint compound. Such a joint compound including calcined gypsum is typically referred to as a setting type joint compound, and preferably includes a set retarder, as disclosed in U.S. Pat. No. 5,779,786, the disclosure of which is hereby incorporated herein by reference.

Two alternative embodiments exist for transferring these small quantity dry ingredients such as thickeners, binder, talc, and gypsum into the blender when feeders are used. In the one embodiment, as illustrated by FIG. 2, these small quantity ingredients are fed directly into the blender 22. Otherwise, as shown in FIG. 1, these small quantity ingredients are transferred to the blender by feeder hoppers 50, 52, 54, 56 (also referred to as feeders). Two options exist for the method of using a feeder to transfer these small quantity ingredients into the mixer as shown in FIG. 1. In one option, the feeders 50, 52, 54, 56 are mounted on a mezzanine floor above the blender 22 and discharge the ingredients into the blender 22. For example, a fork lift may place pallets holding bags or drums of these materials on the mezzanine and an operator may then manually fill the feeders 50, 52, 54, 56 from the bags or drums. In another option, the feeders 50, 52, 54, 56 are mounted on a floor below the blender 22. The small quantity ingredients are transferred from the feeders via a conveyer to the blender 22 located on the mezzanine floor above the feeders. Again, in this embodiment, the operator manually feeds the feeders from bags or drums.

A dry powder blender 22 is preferably used to pre-blend the dry ingredients before they simultaneously enter into the aforementioned mixing apparatus with the liquids. This is done to ensure a homogenous mixture of the very small and large proportions of the dry ingredients. Although any conventional blender 22 may be used, ribbon blenders are preferred. Various blenders are available commercially.

Figure 3:
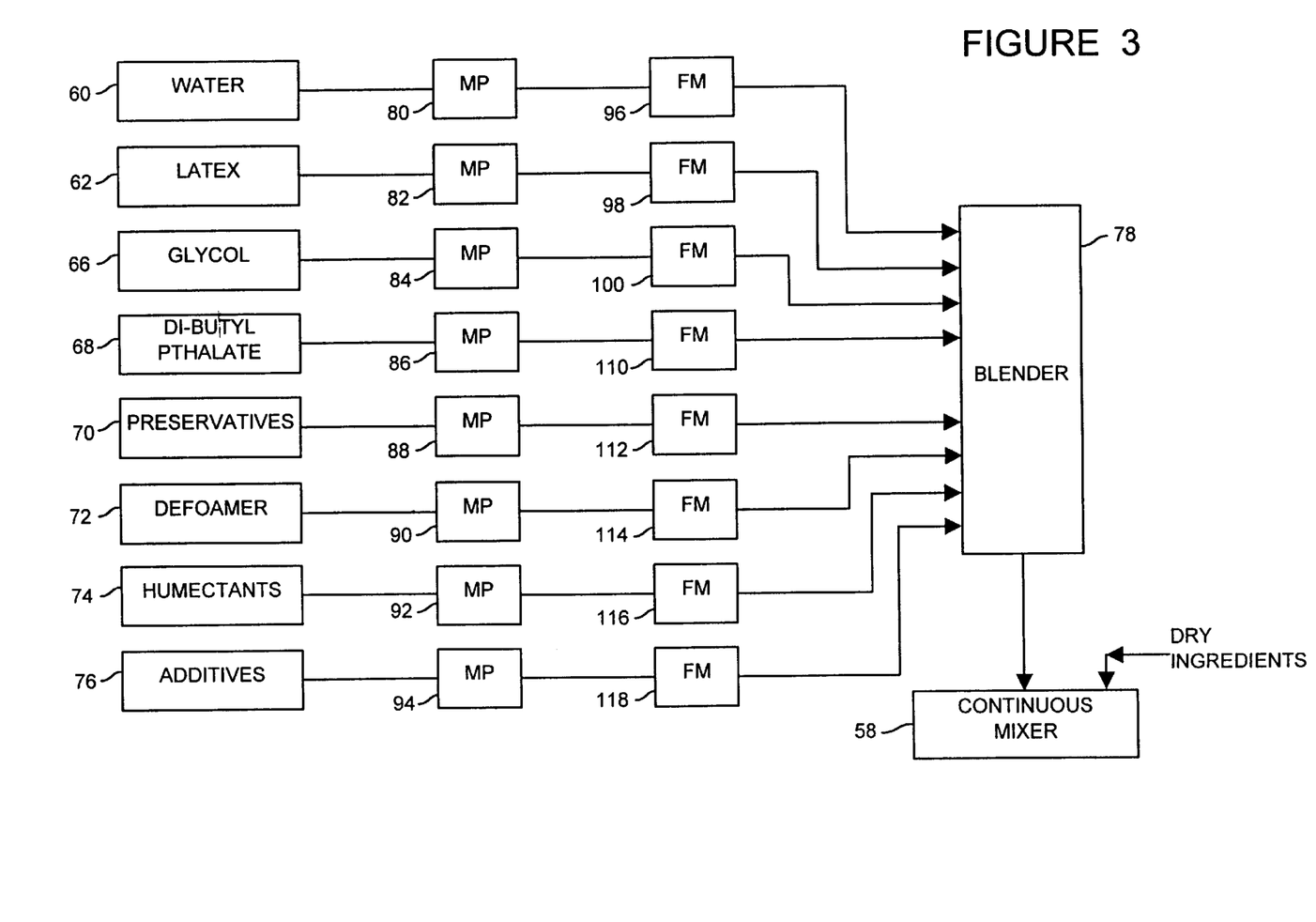
FIG. 3 is a process diagram of the liquid ingredients used in accordance with an embodiment of the invention.
Figure 4:
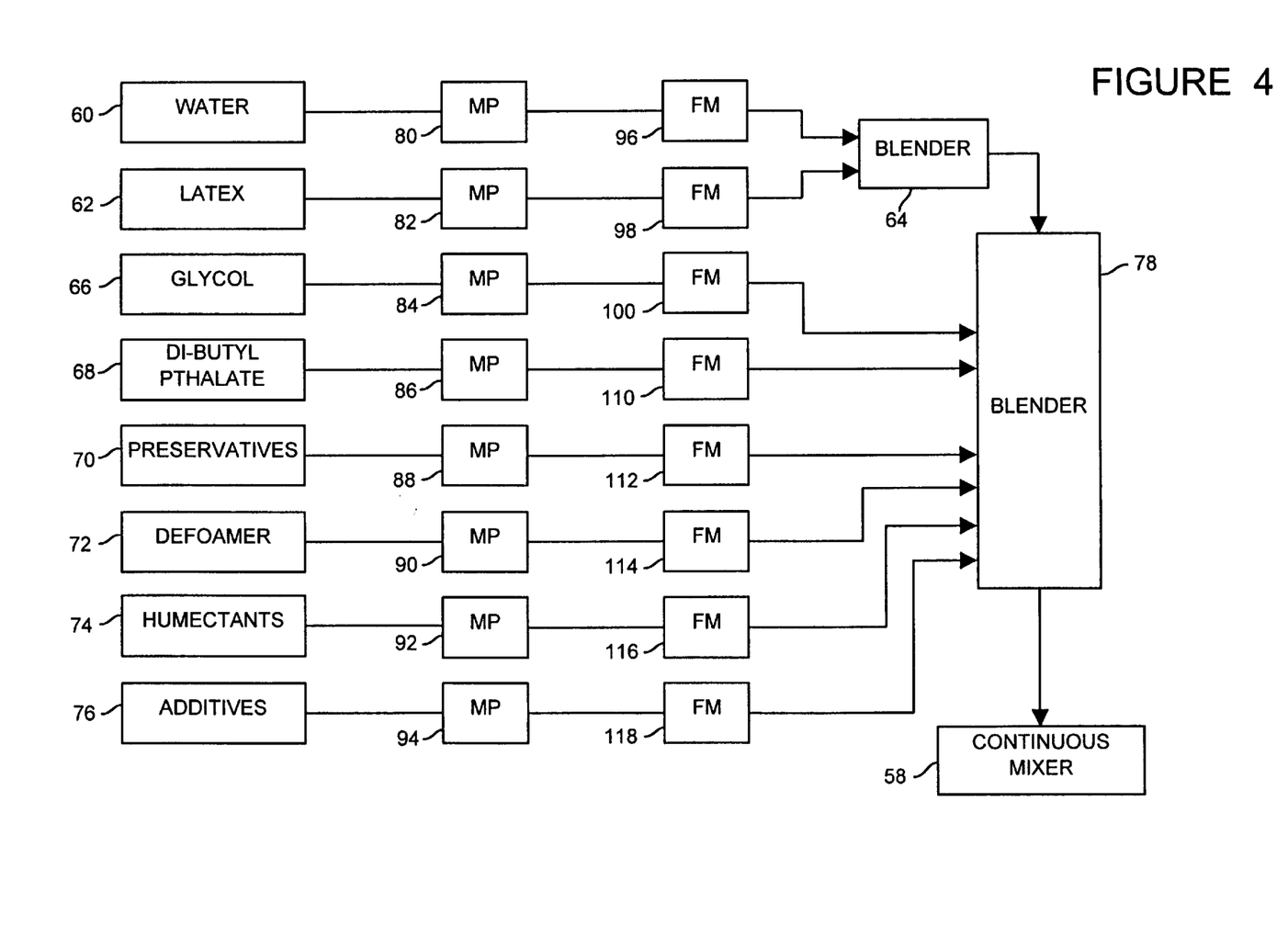
FIG. 4 is an alternate embodiment of a process diagram of the liquid ingredients used according to the invention.

FIGS. 3 and 4 show two embodiments of process diagrams of the liquid ingredients according to the inventive method.

The large volume liquid ingredients such as latex 62, glycol 66, and water 60 are supplied directly from their respective storage tanks to a metering pump 82, 84, and 80, respectively. The glycol 66 is used in the joint compound to provide functional properties to the joint compound such as wet edge, open time, controlling drying time, and freeze/thaw stability. Glycols 66, such as diethyl glycol, manufactured by Dow Chemical Co. of Midland, Mich., or ethylene glycol or propylene glycol are preferred. The amount of glycol 66 used in the joint compound is preferably in a range of about 0.1 weight percent to about 1 weight percent (based on total weight of joint compound), while the preferred feed rate is from about 0.1 pound/minute (about 0.045 kg/minute) to about 0.8 pound/minute (about 0.36 kg/minute).

Latex 62, such as Air Flex 530BP manufactured by Air Product of Allentown, Pa., or Richhold 40716 manufactured by Richhold Corp. of Raleigh, N.C., may be used in the joint compound. Additional latexes that may be used in the process according to the invention include ethylene vinyl acetate, polyvinyl acetate emulsion, and vinyl acetate acrylate latex. The amount of latex 62 used in the joint compound is preferably in a range of about 2 weight percent to about 2.9 weight percent (based on total weight of joint compound), while the preferred feed rate is about 2.9 pounds/minute (about 1.3 kg/minute) to about 5 pounds/minute (about 2.3 kg/minute).

The amount of water 60 used in the joint compound is preferably in a range of about 25 weight percent to about 35 weight percent (based on total weight of joint compound), and more preferably about 30 weight percent to about 33 weight percent. The amount of water based on limestone and other filler is preferably in a range of 30 weight percent to about 32 weight percent. The preferred flow rate of water is in a range of about 6 gallons/minute ("GPM") to about 60 GPM (about 50 pounds/minute to about 500 pounds/minute).

The liquid raw material ingredients are metered with a metering pump ("MP") 80, 82, 84, 86, 88, 90, 92, 94 and flow meter ("FM") 96, 98, 100, 110, 112, 114, 116, 118 and driver (PLC) controlled so that a predetermined measured amount of liquid is delivered to continuous mixing apparatus or mixer 58. Because liquids are fed mechanically, levels of each liquid can be controlled precisely and a high quality product manufactured. Metering is preferably accomplished with commercially-available progressive cavity-type pumps, where each pump is equipped with a magnetic flow meter and the system of pumps are controlled by a PLC. Each ingredient has its own pump metering system, as shown in the Figures, in addition to one operating spare pump (not shown) for the small quantity liquid ingredients. The pumps for the small quantity liquids preferably operate at about 0.1 gallon/minute to about 5 gallons/minute.

In one embodiment, as shown in FIG. 4, water 60 and latex 62 are pre-blended in a blender 64 before being blended in a further blender 78 with the other liquid ingredients which include glycol 66, di-butyl pthalate 68, preservative(s) 70, defoamer(s) 72, humectant(s) 74, and various optional liquid additives 76 (such as fungicide). Preferably, in the embodiment of FIG. 4, the latex 62 is first placed in a bulk tank (not shown). The quantity of latex transferred to be pre-blended with the water is measured using a metering pump 82 and a flow meter 98. Similarly, the water 60 is first placed in a holding tank (not shown). The quantity of water needed is then measured using a metering pump 80 and flow meter 96. The pre-measured water and latex are then pre-blended in the blender 64 prior to being mixed with the other liquid ingredients in another blender 78, as stated above. The embodiment of FIG. 3 does not utilize pre-blending of water 60 and latex 62.

Generally referring to both FIGS. 3 and 4, the small volume liquid raw material ingredients, such as di-butyl pthalate 68, preservative(s) 70, defoamer(s) 72, humectant (s) 74, and optional additive(s) 76, are supplied from a tote via a small reservoir tank for use during tote change out. One or more preservatives 70, such as Troysan 174 or Troysan 364, manufactured by Troy Chemical of Newark, N.J., may be included at a rate in a range of about 0.005% weight percent to about 0.008 weight percent (based on total weight of joint compound), while the feed rate is preferably about 0.005 pound/minute (about 0.0023 kg/min ) to about 0.008 pound/minute (about 0.0036 kg/min).

A defoamer 72, such as the NXZ 9201A defoamer manufactured by Geo Chemical of Clasterd, N.J., may be included at a rate of about 0.118 weight percent to about 0.125 weight percent (based on total weight of joint compound), while the feed rate is preferably about 0.1 pound/minute (about 0.045 kg/min) to about 0.125 pound/minute (about 0.057 kg/min). Generally, any hydrocarbon-based or silicon-based defoamer may be used.

Di-butyl pthalate 68, such as the K-Flex product available from Van Water and Roger of Charlotte, N.C. may be included at a rate of about 0.1 weight percent to about 0.4 weight percent (based on total weight of joint compound), while the feed rate is preferably about 0.1 pound/minute (about 0.45 kg/min) to about 0.4 pound/minute (about 0.18 kg/min).

A humectant 74, such as sorbitol available from Rogette Corp. of Gurnee, Ill. may be included at a rate of about 0.01 weight percent to about 0.05 weight percent (based on total weight of joint compound), while the feed rate is preferably about 0.1 pound/minute (about 0.045 kg/min) to about 0.8 pound/minute (about 0.36 kg/min).

Various additional additives (represented by element 76 in FIGS. 3 and 4) may also be included in the joint compound. Useful additives include polymeric materials such as a low molecular weight polyacrylate sold under the tradename Colloid 231 by Rhodia of Danburry, Conn., as discussed in co-pending, commonly assigned U.S. application Ser. No. 08/779,938, (U.S. Pat. No. 5,879,825) the disclosure of which is hereby incorporated herein by reference. The amount of these additional additive(s) 76 used in the joint compound is preferably about 0.2 weight percent to about 0.8 weight percent (based on total weight of joint compound), while the preferred feed rate is about 0.2 pound/minute (about 0.009 kg/min) to about 0.8 pound/minute (about 0.36 kg/min).

Figure 5:
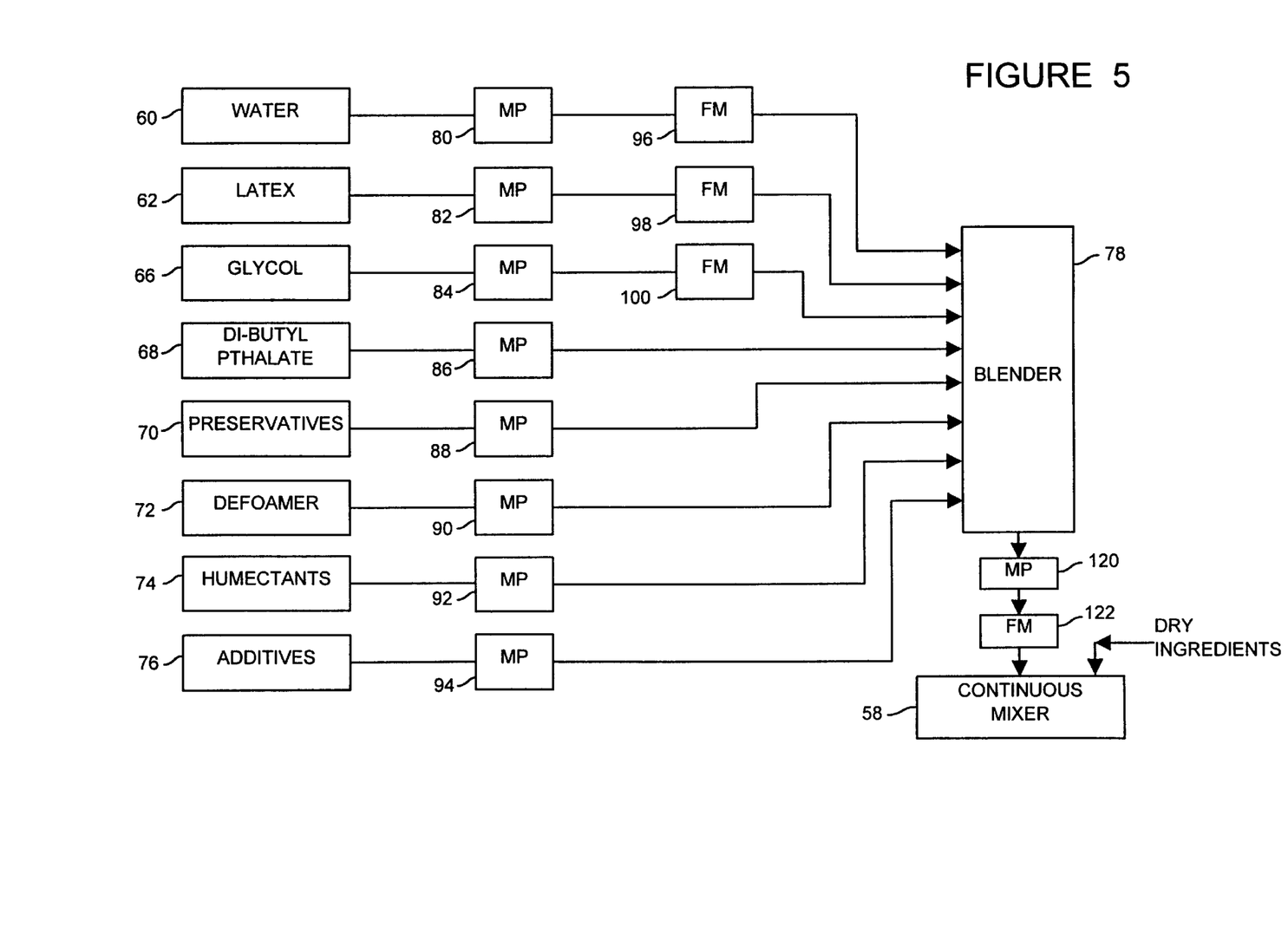
FIG. 5 is an alternate embodiment of a process diagram of the liquid ingredients used according to the invention.

Two systems exist for metering the liquid ingredients that are placed into the continuous mixer 58. In a preferred system, each ingredient is metered with its own dedicated metering pump, flow meter and controller directly into the continuous mixer. This allows changes to be made in ingredient levels when a product with different specifications is desired. In an alternate, less expensive system shown in FIG. 5, each small volume liquid is measured into a blender 78. With one pump 120 and metering 122 system, the liquid ingredients are then fed into the continuous mixer 58. In this embodiment, a second mix tank, pump, and meter system (not shown) should be available for long production runs and changeover to differing products.

Once both the dry ingredients and the liquid ingredients are separately pre-blended, they are then fed to the continuous mixer 58, as shown in the Figures, to produce joint compound.

Various types of continuous mixers 58 may be used in accordance with the inventive method for producing wallboard joint compound. In general, the interior of mixer 58 defining the mixing chamber may range from about 4 inches to 12 inches (about 10 cm to about 30.5 cm) in diameter and from about 24 inches to about 48 inches (about 61 cm to about 122 cm) in length. The volume of the mixer is preferably at least about 2 ft.$^3$ and more preferably in a range of about 2 ft.$^3$ to about 12 ft.$^3$ The mixers generally contain an agitating means, such as a paddle. Mixers manufactured by Prater of Chicago, Ill., Munson of Utica, N.Y., Autocon of Richmond, Calif., and the Readco Company of York, Pa. are suitable for use according to the invention. The Munson and Prater mixers are horizontal shell mixers with rotating shafts and attached paddle style mixers. The mixing action is the result of both the agitation from the adjustable pitched paddles and the retention time of the product in the mixing chamber. The Autocon mixer has an outer shell and a rotating inner shell with paddles in a vertical oriented configuration. The Readco mixer has horizontal co-rotational shafts with close tolerance between the paddles and paddle walls resulting in what is described as a kneading and wiping action. The Readco mixer further has multiple location mix chamber liquid entry points. These continuous mixers may have an output rate that can be varied in a range of about 150 pounds of final product per minute (about 12 GPM or about 68 kg/min) to about 840 pounds of final product per minute (about 70 GPM or about 380 kg/min).

The stirring mechanism (e.g., the paddle(s)) on the interior of the mixing apparatus 58 preferably moves at a rate of at least 600 rpm, more preferably in a range of about 600 rpm to about 1350 rpm, and most preferably in a range of about 750 rpm to about 900 rpm. The mixing apparatus 58 preferably has controls allowing for adjustment of these speeds depending upon other process parameters.

As mixing is occurring, a Nametre viscometer may be used to measure the viscosity of the composition to ensure a consistent product. The viscosity reading should permit control of the amount of water that is added to the slurry, in order to ensure that the desired viscosity is maintained. The slurry discharged from the mixer 58 is then transferred by a pump to a holding tank. Vacuum processing, if necessary, can be performed at this point in the process.

Tables II shows a summary of the preferred weight percents (based on total weight of joint compound) and flow rates of ingredients used to produce the joint compounds according to the invention. Weight percents are based on total weight of the final composition. Table III shows the density and flow rate of ingredients used to produce the joint compound according to the invention at different system capacities.

TABLE II

| Ingredient | Weight % | Flow Rate (lbs./min.) |
|---|---|---|
| Dry Ingredients | | |
| Limestone | 60–70 | 100–400 |
| Perlite | 1–6 | 3–6 |
| Clay | 1–4 | 1–6 |
| Mica | 1–4 | 1–4 |
| Thickener | 0.1–5 | 0.1–0.5 |
| Binder | 0.1–0.4 | .06–3 |
| Talc | 1–4 | 0.5–3 |
| Liquid Ingredients | | |
| Preservatives | 0.005–0.008 | 0.005–0.008 |
| Defoamer | 0.118–0.125 | 0.1–0.125 |
| Di-butylpthalate | 0.1–0.4 | 0.1–0.4 |
| Humectant | 0.01–0.05 | 0.1–0.8 |
| Additives | 0.2–0.8 | 0.2–0.8 |
| Glycol | 0.1–1 | 0.1–0.8 |
| Latex | 2–2.9 | 2.9–5 |
| Water | 25–35 | 50–500 |

TABLE III

| | | PREFERRED FLOW RATE | | | |
|---|---|---|---|---|---|
| INGREDIENT | DEN-SITY | System Capacity 150 lbs/min | System Capacity 262 lbs/min | System Capacity 421 lbs/min | System Capacity 850 lbs/min |
| DRY INGREDIENTS | | | | | |
| Limestone | 90 lb/ft$^3$ | 97 lb/min | 170 lb/min | 272 lb/min | 544 lb/min |
| Clay | 30 lb/ft$^3$ | 2.5 lb/min | 4.3 lb/min | 6.9 lb/min | 13.8 lb/min |
| Mica | 25 lb/ft$^3$ | 6.1 lb/min | 10.7 lb/min | 17.2 lb/min | 35.0 lb/min |
| Perlite | 11 lb/ft$^3$ | 6.0 lb/min | 10.5 lb/min | 17.0 lb/min | 34.0 lb/min |
| Methocel 40320 | 31 lb/ft$^3$ | 0.3 lb/min | 0.56 lb/min | 0.91 lb/min | 1.8 lb/min |
| HEC 3082 | 31 lb/ft$^3$ | 0.3 lb/min | 0.56 lb/min | 0.91 lb/min | 1.8 lb/min |
| Polyvinyl Acetate | 38 lb/ft$^3$ | 0.12 lb/min | 0.21 lb/min | 0.34 lb/min | 0.68 lb/min |

TABLE III-continued

| | | PREFERRED FLOW RATE | | | |
|---|---|---|---|---|---|
| INGREDIENT | DEN-SITY | System Capacity 150 lbs/min | System Capacity 262 lbs/min | System Capacity 421 lbs/min | System Capacity 850 lbs/min |
| LIQUID INGREDIENTS | | | | | |
| Water | 8.33 lb/gal | 4.86 GPM | 8.6 GPM | 13.7 GPM | 27.4 GPM |
| Latex | 9.0 lb/gal | 0.2 GPM | 0.36 GPM | 0.57 GPM | 1.14 GPM |
| Glycol | 9.3 lb/gal | 0.09 GPM | 0.16 GPM | 0.26 GPM | 0.52 GPM |
| Defoamer | 7.6 lb/gal | 0.003 GPM | 0.006 GPM | 0.009 GPM | 0.018 GPM |
| Preservatives | 7.8 lb/gal | 0.002 GPM | 0.004 GPM | 0.006 GPM | 0.012 GPM |
| Sorbitol | 9.5 lb/gal | 0.009 GPM | 0.016 GPM | 0.026 GPM | 0.052 GPM |
| Di-butyl Pthalate | 9.0 lb/gal | 0.01 GPM | 0.02 GPM | 0.038 GPM | 0.076 GPM |

The inventive method avoids the above-described disadvantages of batch processes, facilitates transition between products with little or no contamination from previous products, and provides a cost-effective process with high production rates.

EXAMPLE 1

Table IV shows a comparison of two processes for manufacturing ready mix light weight joint compounds, one using a batch process and one using a continuous process of the invention. Each process manufactured 11,715 pounds of ready mix joint compound according to the recipes defined below.

The batch process manufactured the joint compound in 35 minutes while the continuous process according to the invention manufactured the same amount of joint compound in only 18 minutes. Furthermore, as shown in Table IV, the continuous process used reduced levels of Troysan 364, Troysan 174, defoamer, diethylene glycol, Super Gel B Clay, mica, talc, methocel, latex, Sil Cel, and water because of uniform mixing at a high intensity and lower mixing area. Because the inventive process was able to use reduced levels of these ingredients, the process was able to use higher levels of lower cost limestone filler.

TABLE IV

Formula for Batch Mixer vs. Continuous Mixer
Light Weight Ready Mix Joint Compound

| | Quantity in Lbs. (kg) | |
|---|---|---|
| Materials | Batch | Invention |
| Water | 2500.0 (1135) | 2500.00 (1135) |
| Troysan 364 | 3.0 (1.36) | 2.00 (.908) |
| Troysan 174 | 15.0 (6.81) | 13.00 (5.9) |
| Defoamer | 12.0 (5.45) | 10.00 (4.54) |
| Diethylene Glycol | 110.0 (49.9) | 100.00 (45.4) |
| Limestone | 2760.0 (1253) | 2800.00 (1271) |
| Super Gel B Clay | 212.5 (96.5) | 180.00 (81.7) |
| Mica [52–90] | 525.0 (238) | 400.00 (181.6) |
| Talc [45–26] | 575.0 (261) | 400.00 (181.6) |
| Methocel [40320] | 66.5 (30.2) | 56.00 (25.4) |
| Latex [40716] | 610.0 (276.9) | 600.00 (272.4) |
| Perlite Sil Cel [43–34] | 566.0 (257) | 560.00 (254) |
| Limestone | 1060.0 (481) | 1400.00 (635.6) |
| Water | 2200.0 (999) | 2200.00 (999) |
| Water | 100.0 (45.4) | |

Table V shows the changes in viscosity over time of the joint compounds manufactured according to Table IV. The viscosity of the joint compound manufactured by the inventive continuous process increased from about 500 Braebender Units ("BU") to about 560 BU in 24 hours, while the viscosity of the joint compound manufactured by the batch process showed a greater increase, from about 450 BU to about 600 BU in 24 hours. Thus, the joint compound of the invention had a more stable viscosity.

TABLE V

| Control Values | | Batch | Invention |
|---|---|---|---|
| Viscosity | Mixer | 450 ± 10 BU | 500 ± BU |
| | Package | 550 ± 50 BU | 500 ± 50 BU |
| | 24 Hours | 600 ± 50 BU | 560 ± 30 BU |

EXAMPLE 2

Table VI similarly shows a comparison of ingredients used in processes for manufacturing two all-purpose ready mix joint compounds, one using a batch process and the other a continuous process according to the present invention.

TABLE VI

| | Quantity in Lbs. (kg) | |
|---|---|---|
| Formula | Batch | Invention |
| Water | 3280.0 (1489) | 3280.0 (1489) |
| Troysan 364 | 3.0 (1.36) | 2.0 (.91) |
| Troysan 174 | 15.0 (6.81) | 13.0 (5.9) |
| Defoamer | 9.0 (19.8) | 6.0 (2.7) |
| Glycol | 75.0 (34) | 50.0 (22.7) |
| Attapulgite Clay | 385.0 (175) | 300.0 (136) |
| Mica | 800.0 (363) | 600.0 (272) |
| Talc - MP 45-26 | 750.0 (340) | 250.0 (113.5) |
| Methocel 40320 | 81.0 (36.8) | 70.0 (31.8) |
| Polyvinyl Alcohol | 15.5 (7.0) | 10.5 (4.76) |
| Sorbitol | 3.5 (1.6) | 3.5 (1.6) |
| Limestone | 3546.0 (1610) | 3746.0 (1700) |
| Latex 40716.00 | 351.0 (159) | 338.0 (153) |
| Water | 1160.0 (527) | 1160.0 (527) |
| Limestone | 3546.0 (1610) | 3746.0 (1700) |
| Water | 1160.0 (527) | 1000.0 (454) |
| Limestone | 3546.0 (1610) | 3746.0 (1700) |
| Water (Fix-up) | 485.0 (220) | |

EXAMPLE 3

This example illustrates a preferred method for manufacturing joint compound according to the present invention.

First, the operator selected a desired program recipe from a computer control screen, and confirmed accuracy of all set points with respect to the desired product. Next, the operator adjusted the set points for the limestone dry additive mixer amps and latex amps.

When all starting parameters were set at the correct specifications, the operator started a continuous mixing apparatus by pushing the mixer start push button. After the mixer was running, the operator pushed the master switch to actuate the liquid and dry additive system.

The liquid and dry ingredients were continuously fed to a continuous mixer using a PLC control. The viscosity of the composition exiting from the mixer was continuously monitored by inline viscosity, and the rate of water addition was adjusted by automatic control to produce the desired viscosity.

The mixer mixed the dry and liquid ingredients at a high intensity mixing rate for about 35 seconds to about 5 minutes, depending on the type of product. An inline viscometer installed in the transfer line measured and recorded the viscosity of the finished products. The continuously produced ready mix joint compound was then conveyed to a holding tank, where a pump transferred the product to a packaging line.

Table VII shows a summary of the properties of a representative continuous joint compound produced according to the invention, as compared to a joint compound produced by a batch process.

TABLE VII

| Product Manufactured | Inventive All Purpose Ready Mix Joint Compound | Ready Mix Joint Compound Produced by Batch Process |
| --- | --- | --- |
| Appearance | Smooth, creamy, uniform | paste |
| Viscosity | 650 BU | 670 BU |
| Viscosity after 24 hrs. | 660 BU | 630 BU |
| Density (lb./gal.) | 14.4 | 14.2 |
| % solids | 69.8 | 70.2 |
| % shrinkage | 17.8 | 19.6 |
| % tape bond | 100% | 90% |
| Sanding characteristics - 10 cycle | 0.396 | 0.356 |

The continuous process according to the invention provides many advantages. A continuous process of the invention produces a consistent high quality joint compound faster and more efficiently than traditional batch processes. The inventive process saves time in both processing and clean-up operations. Furthermore, the continuous process allows more flexibility in processing as well as enabling production of a consistent, quality product without the variations usually encountered with batch operations.

More specifically, in the continuous process of the invention, the residence time is generally much shorter (from about 1 to about 2 minutes) than the residence time in a batch process (normally from about 25 to about 45 minutes). The decreased residence time in the continuous process according to the invention is due, in part, to the high intensity mixing used by the invention measured as higher revolutions per minute ("rpm") of the continuous mixer over that of a batch mixer. While a batch mixer typically operates at only approximately 45 to about 70 rpm, the continuous mixer according to the invention is able to operate at approximately 650 rpm to about 1650 rpm.

It has surprisingly been found that because the continuous mixer operates at a higher rpm than a batch mixer, there is better dispersion of the solid particles in the liquid component, which contributes to a lower residence time in the continuous process of the invention. Batch mixers used in conventional processes cannot effectively produce joint compound at the same high rpm as that of a continuous mixer. If operated at a high rpm, a batch mixer would allow a substantial amount of air to enter into the joint compound being manufactured. Air in the joint compound is undesirable, for example, because it creates problems at the job site in finishing drywall, such as surfaces that are pock-marked (pin hole air voids in a dried surface of finishing joint).

It has also been discovered that another factor contributing to allowance of a shorter residence time in the inventive process is the preferred close clearance of the blades in preferred continuous mixers, which creates higher heat transfer coefficients. This allows further reduction in residence time.

The reduced residence time of the invention thus increases the production rate of the joint compound. Further, because of the lower residence times, the continuous process according to the invention may use less energy than a typical batch process to produce the same amount of joint compound, resulting in further economic advantages.

The efficiency and the production rate of the process according to the invention is further improved because the continuous mixer can be more easily cleaned than a batch mixer. This is due to the fact that there is less material build-up in a continuous mixer than in a batch mixer. The self-wiping action of a continuous mixer prevents material build-up inside the mixer and can reduce the clean-up time by as much as 90%. Thus, there is less down time for cleanup when a continuous mixer is used.

Another advantage of the continuous process according to the invention is that the process may require reduced amounts of various ingredients, or completely eliminate the need for some materials conventionally used to produce joint compound.

For example, less water is needed to produce joint compound in the inventive continuous process than in a batch process. In the continuous process, from about 25 weight percent to about 35 weight percent water is used to manufacture the joint compound, while from about 36 weight percent to about 45 weight percent water is typically needed in a batch process to manufacture the same amount of joint compound. Not only is the use of less water more cost and time efficient, but it also produces a higher quality joint compound. When there is less water in the joint compound it improves drying of the joint compound, there is less shrinkage and cracking. Furthermore, less water in the joint compound creates a joint compound that has a more consistent viscosity over time as compared to joint compound produced in a batch process.

In addition, the use of surface treatments on thickeners and potassium carbonate may be eliminated, because the process eliminates the need for a surface treatment on water soluble polymers (e.g., Methocel 2405, Methocel 40320, etc.). In conventional batch processes, water soluble polymers, such as Hydroxy Propyl Methyl Cellulose (HPMC) and Hydroxy Ethyl Cellulose (HEC) are used as thickening agents. To prevent lump formation during the mixing cycle, these water soluble polymers are surface treated with glyxol. After the water soluble polymers are adequately mixed, potassium carbonate is then used to hydrate these thickeners and strip off the surface treatment. In the continuous process according to the invention, because the continuous mixer operates at a higher RPMs, the thickeners are able to thoroughly disperse through the mixture without any lump formation and hydrate quickly. Thus, untreated thickeners can be used and subsequently potassium carbonate is not required. Furthermore, the amount of mica used may be reduced by about 10% as compared to a batch process. The amount of other ingredients, such as preservatives, defoamers, glycol, clay, talc, thickeners, latex, and perlite may also be reduced.

The foregoing detailed description is given for clearness of understanding only, and no unnecessary limitations should be understood therefrom, as modifications within the scope of the invention will be apparent to those skilled in the art.

What is claimed is:

1. A method of continuously producing a cementitious slurry, comprising the steps of:
   (a) pre-mixing at least two ingredients selected from limestone, perlite, clay, mica, thickeners, binders, talc, gypsum, stucco, or urea;
   (b) pre-mixing at least two ingredients selected from the group consisting of water, latex, glycol, dibutyl phthalate, preservatives, defoamers, and humectants;
   (c) adding said pre-mixed ingredients from step (a) and said pre-mixed ingredients from step (b) to a continuous mixing apparatus; and
   (d) at least substantially continuously blending said ingredients in said mixer to produce said cementitious slurry.

2. The method of claim 1, wherein step (d) comprises blending with an agitator moving at a speed of at least 600 rpm.

3. The method of claim 2, wherein said agitator comprises a paddle.

4. The method of claim 2, wherein said speed is in a range of about 600 rpm to about 1350 rpm.

5. The method of claim 1, wherein said cementitious slurry comprises about 25 weight percent to about 35 weight percent water, based on weight of the composition.

6. The method of claim 1, wherein said cementitious slurry is a joint compound comprising about 55 weight percent to about 75 weight percent limestone, based on weight of the slurry.

7. The method of claim 1, comprising at least substantially continuously producing at least about 20,000 pounds (about 9080 kg) of said slurry.

8. The method of claim 1, further comprising:
   (e) continuously removing said slurry from said apparatus.

9. The method of claim 1, wherein said cementitious slurry is a joint compound and said pre-mixed ingredients from step (a) comprise calcium sulfate dihydrate and calcium carbonate.

10. The method of claim 1, wherein said cementitious slurry is a joint compound and said pre-mixed ingredients from step (a) comprise calcium sulfate hemihydrate and a retarder.

11. The method of claim 1, wherein the water has a flow rate in a range of about 6 gallons/minute to about 60 gallons/minute.

12. The method of claim 1, wherein the limestone has a flow rate in a range of about 100 pounds/minute to about 400 pounds/minute.

13. The method of claim 9, wherein said cementitious slurry is a joint compound and said pre-mixed ingredients from step (b) comprise water and latex.

14. A method of continuously producing a cementitious slurry, comprising the steps of:
   (a) combining ingredients comprising (1) a filler selected from the group consisting of calcium sulfate dihydrate and limestone; (2) water; (3) a binder and; (4) an ingredient selected from the group consisting of latex, glycol, dibutyl pthalate, preservatives, defoamers, and, humectants;
   (b) continuously blending said ingredients in a mixing apparatus having an agitator moving at a speed of at least 650 rpm; and
   (c) continuously removing the product of step (b) from said mixing apparatus.

15. The method of claim 14, wherein said agitator comprises a paddle.

16. The method of claim 14, wherein said speed is in a range of about 650 rpm to about 1350 rpm.

* * * * *